US006843866B2

(12) United States Patent
Brenner et al.

(10) Patent No.: US 6,843,866 B2
(45) Date of Patent: Jan. 18, 2005

(54) PROCESS FOR PRODUCING WEAR-RESISTANT SURFACE LAYERS

(75) Inventors: Berndt Brenner, Dresden (DE); Volker Fux, Pirna (DE)

(73) Assignee: Fraunhofer-Gesellschaft zur Foerderung der Angewandten Forschung e.V., Munich (DE)

( * ) Notice: Subject to any disclaimer, the term of this patent is extended or adjusted under 35 U.S.C. 154(b) by 220 days.

(21) Appl. No.: 10/208,835

(22) Filed: Aug. 1, 2002

(65) Prior Publication Data

US 2003/0121574 A1 Jul. 3, 2003

(30) Foreign Application Priority Data

Aug. 2, 2001 (DE) .......................... 101 37 776

(51) Int. Cl.⁷ .............................. H05B 6/02; C21D 1/42
(52) U.S. Cl. ....................... 148/525; 148/526; 148/565; 148/567; 219/601; 219/121.85
(58) Field of Search ................... 149/525, 526, 149/565, 567; 219/601, 121.85

(56) References Cited

U.S. PATENT DOCUMENTS

| 5,224,997 A | * | 7/1993 | Grilloud et al. | ............ | 118/667 |
| 5,900,079 A | * | 5/1999 | Ono et al. | ............ | 148/519 |
| 6,024,792 A | * | 2/2000 | Kurz et al. | ............ | 117/9 |
| 6,365,866 B1 | * | 4/2002 | Brenner et al. | ........ | 219/121.14 |
| 6,398,881 B1 | * | 6/2002 | Brenner et al. | ............. | 148/321 |

FOREIGN PATENT DOCUMENTS

| EP | 0190378 | 8/1986 |
| EP | 0462047 | 12/1991 |

OTHER PUBLICATIONS

Publication titled "Induktiv Unterstütztes Laserauftragschweiben–Eine Hybridtechnologie Überwindet Anwendungsgrenzen" (*B. Brenner, V. Fux. A. Weizig. S. Nowotny*), 6th European Conference on Laser Treatment of Materials, Stuttgart. Sep. 16–18. 1996, conference materials pp. 477–484.

Publication titled "Beschichten Von Automobilventilen Mit der Laser–Induktions–Technologie" elektrowärme international (vol. 51) 1993 B3. Sep. issue, pp. B113–B115.

Publication titled "Härterei–Technische Mitteilungen", Brenner, B. et al., 52 (1997) No. 4, pp. 221–225, is discussed in the specification beginning on p. 15.

\* cited by examiner

*Primary Examiner*—George Wyszomierski
(74) *Attorney, Agent, or Firm*—Greenblum & Bernstein, P.L.C.

(57) ABSTRACT

Process for the effective production of very wear-resistant layers in the thickness range of 0.2 to approx. 3 mm by way of inductively supported surface layer modification. It can be used particularly advantageously for the protection of components of hardenable steels and cast iron with abrasive, corrosive, high-temperature corrosive or mineral sliding wear loading. With the process according to the invention a local two-stage inductive short-time preheating takes place directly before the surface layer coating. Due to the invention it is possible to coat even hardenable steels or other materials difficult to coat without cracking. Furthermore, even harder coating materials susceptible to cracking which provide better wear-resistances can be used. In addition, process speeds and surface coating performances can be achieved that are higher by a factor of 10 compared with conventional laser build-up welding. This abstract is neither intended to define the invention disclosed in this specification nor intended to limit, in any manner, the scope of the invention.

29 Claims, 4 Drawing Sheets

PROCESS FOR PRODUCING WEAR-RESISTANT SURFACE LAYERS

CROSS-REFERENCE TO RELATED APPLICATIONS

The present application is based upon German Priority Application No. 101 37 776.2, filed Aug. 2, 2001, the disclosure of which is hereby expressly incorporated by reference hereto and the priority of which is hereby claimed under 35 U.S.C. §119.

BACKGROUND OF THE INVENTION

1. Field of the Invention

The invention relates to a process for the effective production of highly wear-resistant layers on inductively heatable workpieces. Articles for which their application is possible and useful, are a number of components subjected to abrasive, corrosive, adhesive or sliding wear, preferably made of steel, but also of cast iron or aluminum or titanium alloys. The invention is particularly advantageously applicable to all hardenable steels or steels susceptible to cracking, such as, e.g., heat-treatable steels, tool steels, cold work steels, bearing steels and hardenable sorts of gray iron. Components for which this invention can be used are, e.g., motor components, pump shafts, heat exchangers and heat exchanger pipes, forming tools, components in the oil production industry, camshafts, cam levers, valves and the like.

2. Discussion of Background Information

It is known that components made of metallic construction materials can be more effectively and selectively protected against wear with the aid of laser build-up welding than with the classic processes such as, e.g., TIG or plasma powder build-up welding, flame spraying or plasma spraying. The reasons for the better tribological and corrosive resistance lie, i.a., in the lower dilution with the basic material of the layers that can be produced with the laser. This is ultimately possible due to the very localizable and controllable energy input with comparatively high power densities and the resulting short process times.

For a number of applications, in particular those with large surfaces subject to wear stress, however, there is the negative effect that the cost of the layers produced by laser build-up welding is too high. The reason for this drawback is that the specific costs of providing energy are much higher with a laser than with other conventional energy sources such as, e.g., TIG or plasma torch.

A second drawback is that the layers produced by means of the laser build-up welding, i.a., tend more towards crack formation than those produced by conventional methods, if a change is made to harder and thus less ductile coating materials or martensitic hardenable substrate materials. The reason for this drawback is due to the fact that the very intensive energy input aimed at and realized with the laser action is associated with very high power densities which lead to large temperature gradients and thus to such high transient thermal tensions in the cooling phase that cannot be tolerated by a number of coating and substrate materials without cracking.

To eliminate both drawbacks at the same time, it is known to preheat the areas to be coated with an inductive additional energy source (cf., e.g., B. Brenner, V. Fux, A. Wetzig, S. Nowotny: *Induktiv unterstütztes Laserauftragschweißen— eine Hybridtechnologie überwindet Anwendungsgrenzen*, 6th European Conference on Laser Treatment of Materials, Stuttgart Sep. 16–18, 1996, conference materials p. 477–484). The inductive preheating has a particularly effective impact on the reduction of the temperature gradient and the reduction of the transient stresses thus possible, because the energy input occurs not only over the surface but at a depth that can be established by means of the induction frequency. Moreover, the specific energy provision costs for the coupled inductive energy are at least one order of magnitude lower than for laser energy.

Yoshiwara and Kawanami (Method for surface-alloying metal with a high-density energy beam and an alloy steel, EP 0190378A1) thus claim a process with which an inductor or an oxygen acetylene burner permanently connected to a laser beam focusing unit in feed direction before the laser-irradiated area act on the workpiece. The area thus preheated is larger than that subsequently irradiated. Accordingly, an unsteady preheating temperature field results with a maximum that is shifted somewhat towards the laser beam and runs before the temperature field produced by the laser beam. In addition to this, the same arrangement can additionally be arranged after the laser beam point, thus realizing a postheating. The amount of energy that is supplied by the second energy source should be a substantial part of the necessary total process energy, but remain less than the amount of energy provided by the laser beam. The arrangement described in EP 0190378A1 can preferably be used for very large workpieces. With it, using an oxygen acetylene burner (data for an inductive preheating are not given), it was possible to alloy an alloy claimed in the same patent in the surface layer of the substrate material 17Cr2W1Ni (tool steel; chemical composition: 1.74% C; 17.4% Cr; 1.78% W; 0.92% Ni; balance Fe) without cracks at a peak temperature of the preheating cycle of 700° C. The feed rate achieved was 75% higher than the rate achieved without preheating (2.4 m/min with 10 kW laser power).

The drawback of the process is that the feed rate cannot be increased to the extent that should actually be possible from estimates of the energy balance. The reason for this is that the temperature fields that can be produced with an inductor (lower energy transmission effectiveness through use of the inductive outer field) or with an oxygen acetylene burner in the claimed arrangement cannot be adequate adapted to the requirements of laser alloying or laser build-up welding. If the additional energy source that yields approximately the same energy as the laser beam, but features a much lower power density, moves in advance of and at the same feed rate as the laser beam, an optimum maximum temperature cannot be achieved. Moreover, the temperature of the preheating temperature field at the time the laser beam passes has dropped so much that no substantial effect can result regarding an increase of the feed rate.

Higher feed rates are achieved according to the solution from EP 0190378A1 by subjecting the entire component to an additional intensive preheating in a furnace (inventive method (2)) before the treatment described above. The preheating temperature of the furnace heating is up to 600° C. If the peak temperature of the short-time preheating cycle is increased to 800° C. by means of the above-mentioned oxygen acetylene burner, the feed rate can be increased to 5.4 m/min with the same laser parameters or accordingly to 225%.

However, it has proven to be a drawback that the pretreatment in the furnace is very complicated, lengthy and expensive. Moreover, it has a detrimental effect that the components have to be transported, positioned and clamped while in a hot condition. The reason for both drawbacks is that the parts have to be thoroughly heated in a separate device.

A further drawback is that, due to the increasing oxidation of the component, the preheating temperature is limited to approximately 600° C. The possibilities of a further increase in speed have thus also been exhausted.

A higher preheating temperature affects the quality of the alloyed layer in that oxide inclusions or pores occur which reduce the mechanical load capacity of the layers and their wear resistance. In the inventive step mentioned an attempt is made to solve this problem by adding deoxidizing elements and slag-forming agents to the coating material. However, due to stochastic melting bath turbulences, it cannot be ensured that all slag particles or metal oxides rise to the melting bath surface. These coats are therefore not suitable for stresses in which very high surface pressings or cyclical tensions occur.

Guilloud, Dekumbis and Gonseth (EP 0462047B1 "Process and apparatus for the formation of surface layers on articles and articles with a surface layer formed according to this process") disclose a process for laser build-up welding of the sealing surfaces of engine valves with which before the laser build-up welding at least the entire functional surface of the component to be coated is uniformly heated by an inductive preheating to a constant temperature, the laser beam is brought into the center or near the center of the inductively heated area and the inductive heating of the entire preheated area is maintained during the laser build-up welding. A temperature of 800° C. is given as the inductive preheating temperature for the claimed exemplary use of automobile valve casings. In a further work, Dekumbis ("Beschichten von Automobilventilen mit der Laserinduktions-Technologie" elektrowärme international (Vol. 51) 1993 B3, September issue, p. B113–B115) gives the increase in the process velocity thus achieved at only 30%, but without specifying absolute values. This indicates that far lower preheating temperatures were used in practice.

A considerable drawback of the process is that evidently only very slight increases in the process velocity could be achieved. The most important reason for this is that the entire functional surface has to be kept at the very high preheating temperature for the full duration of the laser build-up welding.

An increase in the preheating temperature to higher temperature values for greater critical ranges, such as are necessary for conducting this process on larger components, is not possible due to the oxide and scale formation that greatly increases with the temperature. This applies to a greater extent when normal steels are used, which are much less oxidation- and scale-resistant than the valve steels considered, the chemical composition of which has been optimized for a use at higher temperatures.

Another drawback of the process is that it is difficult to apply to larger and in particular intricately formed workpieces. The reason for this is that very intricately formed inductors have to be developed, tested and optimized.

SUMMARY OF THE INVENTION

The invention provides a new kind of preheating process for finishing surface layers and thereby, in particular, for laser surface layer finishing, with which substantially higher feed rates can be achieved while simultaneously avoiding cracks in the layer or the substrate material even when applied to substrate materials susceptible to cracking such as, e.g., martensitic hardenable steels or steels susceptible to heat treatment cracking and very wear-resistant, very hard coating materials with limited ductility.

The invention is based on the task of disclosing a temperature sequence for preheating in surface layer finishing and, in particular, in laser surface layer finishing and a process for its realization, which makes it possible to achieve higher preheating temperatures at least for a very short time and directly before the finishing process without scaling the components, whereby for larger functional surfaces the temperature field must not be kept homogenous over the entire functional area for the full duration of the finishing process, the cooling speed in the crack-critical temperature range can be adjusted independently or almost independently of the peak temperature, and the production of the temperature field can be integrated into the process. Moreover, it should be possible to design the production process so flexibly that the necessary temperature field can also be produced relatively simply in intricately formed components.

According to the invention, the process produces wear-resistant surface layers by way of an inductively supported laser beam treatment on workpieces that can be inductively heated. Advantageous embodiments are also disclosed.

According to the invention, the following new findings are utilized:

No stationary or almost stationary temperature field is necessary to avoid cracks in crack-sensitive substrate materials or very hard and less ductile coating materials.

The feed rates that can be achieved with preheating temperatures of more than approx. 400° C. increase over-proportionally to the value of the local preheating temperature at the start of the laser build-up welding.

A scaling or even a more intensive oxidation at very short exposure times up to very high peak temperatures can be prevented or kept within acceptable limits or effectively reduced by a simple protective gas rinse.

A low oxidation is advantageous for the coating process and does not impair the resulting layer properties, and that Contrary to the opinion of experts, the coating process proceeds in an unexpectedly stable manner even at very high preheating temperatures.

According to one aspect of the invention, the preheating temperature field of the process according to the invention comprises two superimposed, inhomogeneous and unsteady temperature fields $T_1(\bar{r}, t)$ and $T_2(\bar{r}, t)$. They form the merging preheating cycles $V_1$ and $V_2$. The superposition thereby occurs such that the general temperature maximum is achieved in the preheating cycle $V_2$ and this temperature maximum $T_{2max}$ is positioned in the direction of the laser beam incidence point $L_P$. Both the maximum temperature $T_{2max}$ and the temperature gradient $$\left(\frac{\Delta T_{2max}}{\Delta t_2}\right)$$

are larger and the corresponding heat reaction times $\Delta t_2$ are smaller than the corresponding values $T_{1max}$, $$\left(\frac{\Delta T_{1max}}{\Delta t_1}\right),$$

$\Delta t_1$ of the preheating cycle $V_1$. All the advantages of a high preheating temperature, such as, e.g., a more advantageous division of work in terms of energy between the laser energy that is expensive relative to the power yield and the cost-effective inductive energy, and a considerably higher feed rate are thus achieved, without having to accept the disadvantages of a high preheating temperature covering larger volume ranges, such as, e.g., too great a heat load, distortion, damage to the structure. At the same time, through the subordinate temperature field $T_1$, a cooling speed that is too high in crack formation critical temperature ranges can be avoided and thus also a formation of cracks in critical substrate materials or coating alloys susceptible to cracking. Through the separate adjustment of the parameters, feed rates previously impossible can be achieved with guaranteed avoidance of cracks.

The invention also provides suitable and particularly advantageous inductor arrangements for producing the temperature field according to the invention. A simple arrangement for how the temperature field according to the invention can be produced with the aid of two separate inductors. The invention also advantageously exploits the fact that the depth of penetration of the inductive field and thus also the depth to which inductive heat is produced, decreases with the induction frequency. This can be used to reduce the heating depth of the preheating cycle $V_2$ to the level necessary for increasing the speed of the laser machining process. Without violating the inventive concept, the two inductors $I_1$ and $I_2$ can also be arranged spatially separated from one another. Thus, e.g., inductor $I_1$ can heat the component in the preheating cycle $V_1$ in a separate preheating station completely or almost completely parallel in cycle time to the laser beam treatment, while inductor $I_2$, e.g., can be physically connected to the laser beam machining head and generate the preheating cycle $V_2$ ahead of the laser beam.

However, as will be described herein, for applications in particular on larger components, both preheating cycles $V_1$ and $V_2$ can also be produced by a single appropriately embodied inductor $I_G$. This approach is particularly favorable in economic terms, because only one induction generator is required.

Further variants for how the temperature field can be produced advantageously with only one inductor, are described herein. The invention also utilizes the fact that with constant connecting conditions, the amount of heat inserted increases with the reaction time. The preheating cycles $V_1$ and $V_2$ according to the invention and their superposition can be generated by an oscillating movement of the inductor with a correspondingly selected movement function.

The realization of the preheating cycles according to features described herein is provided in particular for larger flat or axially symmetrical components, the functional areas of which are so wide that they have to be treated by way of track by track scanning. The pulsating temperature increases $\Delta T_{1n}^*$ in the preheating cycle thereby occur because each place to be treated on the component is traveled over several times by way of the inductor $I_{12b}$ that is permanently attached to the laser machining head, the reaction zone width of which crosswise to the feed direction is larger than the track spacing a, and, after coating one track, the entire arrangement is displaced by the desired track spacing a. The peak temperature of the preheating cycle $T_{1max}$ is thus achieved in a pulsating manner. The greater and quicker temperature increase $\Delta T_2^*$ in the preheating cycle $V_2$ can be achieved, e.g., by way of a more intensive energy injection through the inductor part located directly before the laser incidence point $L_p$.

The inventive concept is not limited to the energy input to produce the preheating cycle $V_2$ having to be inductive. As noted herein, one or more suitably arranged high-power diode lasers can also be used without violating the inventive concept.

The invention also advantageously exploits the fact that an oxidation to the specified extent is not harmful to the laser machining process and the resulting tribological and mechanical properties and, moreover, improves the absorption of the laser energy. As experiments have shown, just the inert gas shielding of the preheating zone of the preheating cycle $V_2$ is possibly sufficient to prevent further oxidation.

The process according to the invention is not restricted to the laser build-up welding or laser alloying described in the prior art. As stated herein, it can also be used equally advantageously for laser remelting, laser soldering and, with additional ways to adjust and maintain special process gas mixtures, also for laser gas alloying.

Contrary to the opinion of experts, it turned out that the partial melting of the substrate can be very well controlled or avoided even at very high preheating temperatures according to the invention. The invention also uses this in an advantageous manner in that the preheating process is applied to a laser soldering process.

As is also described herein, a postheating cycle N, can also be added after the laser process cycle L for materials particularly susceptible to cracking. This postheating cycle $N_1$ is also preferably generated by way of inductive heat input. Economically particularly favorable solutions result, when the inductor 13 is embodied such that both the preheating cycles $V_1$ and $V_2$ as well as the postheating cycle $N_1$ can be realized with this sole inductor. To this end the inductors described herein can be modified accordingly.

The invention also makes advantageous use of the fact that the martensitic zones that occur with hardenable steels under the build-up welded, alloyed, hard-soldered or remelted layer, with an adjusted inductive heat input do not need to cause cracks. The martensitic transformation zone can thus be integrated into the layer construction as a supporting layer, as a result of which transformation, advantageously, the layer thicknesses of the build-up welded, alloyed or remelted layer can be selected smaller and thus the feed rates can be additionally increased. In other cases in which the wear loading next to the functional layer to be treated does not fall to uncritical values right away, very effectively wear-resistant martensitic surface layers can be produced next to the build-up welded, alloyed or remelted layers.

Through the high preheating temperature according to the invention in the preheating cycle $V_2$, the requirements for power and power density for the following process cycle are very substantially reduced. Without violating the inventive concept, the invention also makes advantageous use of this by using a plasma torch instead of a laser as an energy source for the process cycle L. This solution is particularly advantageous when large-area coatings need to be realized in a very economical way with reduced requirements regarding layer quality and mixture.

Normally the additive needed for alloying or coating is supplied as powder. Thus, the invention also makes advantageous use of the new finding that wires or ribbons can be fed to the melting bath much better with the high feed rates that can be achieved according to the invention. Due to the high preheating temperature it is no longer necessary to preheat the additive by way of the laser beam, as is achieved by the normal blowing of the powder into the laser beam. On the other hand, it avoids the negative effect that with the normal laser powder build-up welding and laser alloying the utilization factor of the usually very expensive powder-form additives is reduced with increasing feed rate.

The process control that is most favorable in energy terms results, when the additive is added in molten form. This variant is possible because, due to the very high temperature of the preheating cycle $V_2$ according to the invention, it is possible to control the process cycle L such that, even at high feed rates, a metallic bonding of the melt to the substrate material is produced and fusion defects are avoided.

BRIEF DESCRIPTION OF THE DRAWINGS

The invention is explained in more detail on the basis of the two following exemplary embodiments.

FIG. 1 shows the arrangement for the inductively supported laser build-up welding of the lateral areas of wear-stressed shafts.

DETAILED DESCRIPTION OF THE INVENTION

EXAMPLE 1

Figure 1A:
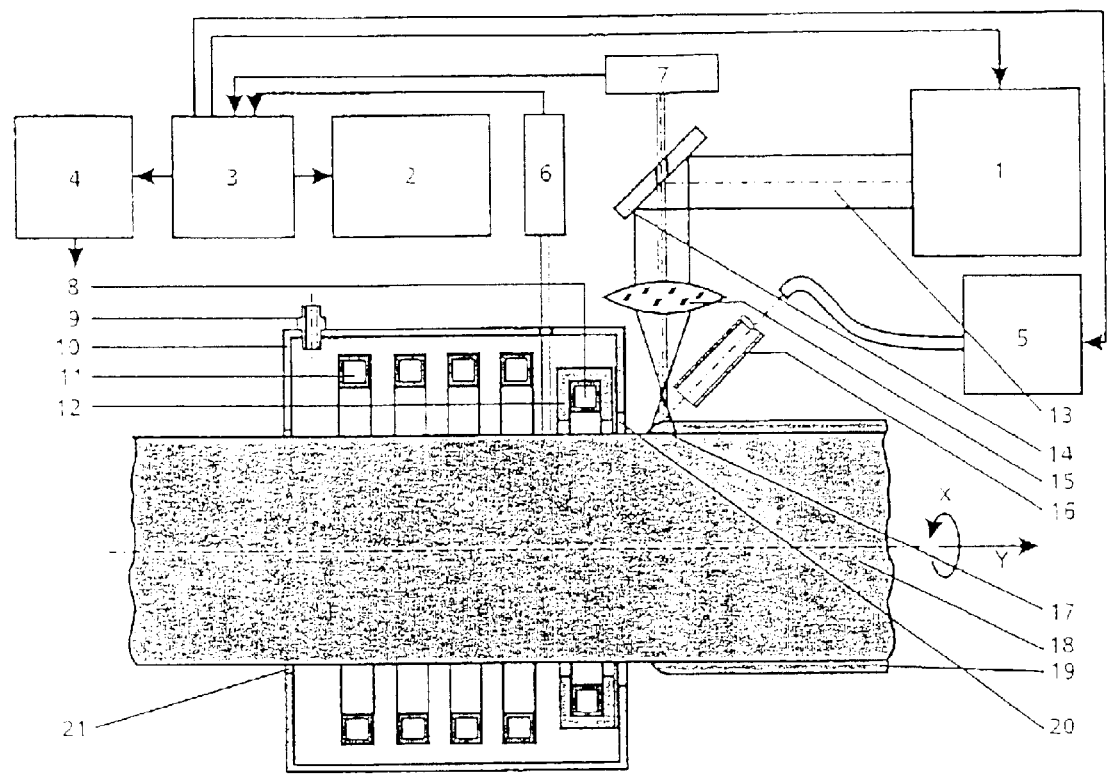
FIG. 1a is a diagrammatic representation of an arrangement according to the invention and FIG. 1b illustrates temperature control for the inductively supported laser build-up welding on the example of a corrosive.

Despite the use of a very wear-resistant steel and surface layer hardening, a newly configured shaft cannot withstand the required abrasive wear stress. In order to increase the operating life and reduce material costs, a transition is to be made to a shaft of 42 CrMo4 steel and a partial laser build-up welding of a very wear-resistant coating material. A mixture of 65% tungsten smelt carbide (TSC) and 35% Ni-matrix material with 14% Cr, 3.5% B and 2.5% Si is chosen as a coating material. In the optimum build-up welded condition, this coating system comprises relatively coarse, angular, not remelted TSC with an average diameter of 70 $\mu$m, embedded in a fine-particle structure of the matrix material.

The very high abrasive wear resistance of this build-up welding material is known from wear experiments.

The shaft has a diameter of 45 mm and is present in a tempered condition. A layer thickness of 0.8 mm is aimed for after over-grinding.

The laser build-up welding takes place with the following parameters: laser beam power 5.0 kW, feed rate 500 mm/min, beam defocusing 29 mm. It leads to a bead width of 5 mm with a bead height of 1.2 mm. In order to obtain a surface that is as even as possible, a track spacing of 2.5 mm is selected, which corresponds to an overlapping degree of 50%. The powder feeding rate is 0.5 kg/h with an estimated powder utilization of 80%.

The normal laser build-up welding is not suitable for applying this relatively brittle coating system to the selected heat-treatable steel without cracking. Many crosswise cracks are formed which spread from track to track and ultimately cover the entire surface. The reason for the formation of cracks is that the shrinkage stresses that occur during cooling in the layer as a result of the very large radial temperature gradients, cannot be plastically removed due to the low ductility of the coating system and therefore exceed the crack formation stress in a critical temperature range. Exceeding this critical stress is supported by the martensite formation occurring during the cooling in the heat affected zone of the shaft, since the compressive stresses arising during the martensite formation in the heat affected zone lead to lateral expansions along the surface which are transferred to the coating as additional tensile stress.

It must therefore be the objective of the process according to the invention to be able to reduce the temperature gradients and the temperature change speeds in an adjustable manner without detrimental effect on the laser build-up welding so that the critical crack formation stress is no longer reached.

A second disadvantage is the low feed rate associated with the laser build-up welding which makes the process uneconomical, since in the case of the above-mentioned shaft the entire surface to be coated is very large compared with the volume of the component. It is therefore the object of the process according to the invention to realize a division of work in energy terms such that the laser beam has only the specific functions of the powder fusing and the partial melting of the surface of the shaft for bonding, while the preheating that requires a great deal of energy up to the required depth is applied by the inductive preheating source.

Figure 1B:
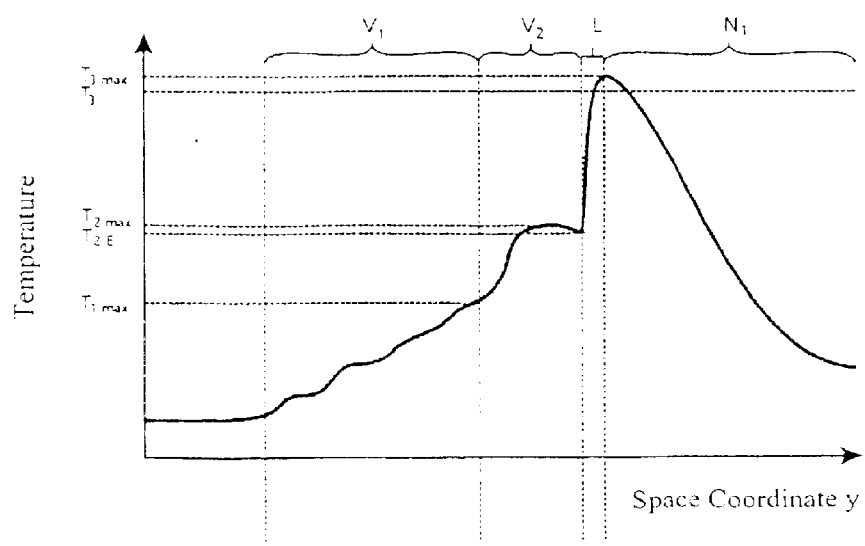

The process according to the invention permits the simultaneous and advantageous solution of both tasks. FIG. 1 shows diagrammatically the arrangement (FIG. 1a) according to the invention realized to this end and the temperature sequence (FIG. 1b) according to the invention. The temperature sequence according to the invention is additionally explained more precisely and provided with all necessary reference numbers in FIG. 2.

The shaft 18 is to be coated with the multi-component coating material described above. The main components of the arrangement comprise a $CO_2$ laser 1, an induction generator 2, a CNC control 3, a laser machining system 4, the powder feeder and the inductors 8 and 11.

The laser beam 13 is directed on the workpiece 18 by the bending mirror 14 and focused by the laser beam shaping system 15. The bending mirror 14 is reflective for the wavelength 10.6 $\mu$m of the $CO_2$ laser and transparent for the wavelength range around 1 $\mu$m. The temperature of the laser process zone 17 can thus be controlled and regulated by the pyrometer 7.

The inductor $I_G$ comprises the two inductor parts $I_1$ 11 and $I_2$ 8 which respectively produce the preheating cycles $V_1$ and $V_2$. It is a five-coil ring inductor, whereby the first 4 coils form the inductor part $I_1$ 11 and the fifth coil forms the inductor part $I_2$ 8. The coupling spacing for the inductor part $I_2$ 11 is selected at 5 mm. With the selected coil distance of approx 4 mm, this coupling spacing guarantees a gentle decoupling with adequate homogeneity of the inductive field. In order to produce the necessary increased energy density for the preheating cycle $V_2$ and the following greater temperature change speed $$\left(\frac{\Delta T_{2max}}{\Delta t_2}\right) > \left(\frac{\Delta T_{1max}}{\Delta t_1}\right)$$

for the inductor part $I_2$ 8, the coupling spacing is reduced to 2 mm and surrounded by magnetic field amplifying sheets 12 acting as magnetic field concentrators. The distance between the laser beam incidence point 17 and the boundary of the magnetic field amplifying sheets is 7 mm.

The inductor $I_G$ (8+11) is surrounded by a protective gas cover 10. An inert gas is admitted via the protective gas inlet 9 which escapes at low speed from the protective gas outlets 20 and 21. An adequate oxygen seal is thus ensured. The pyrometer 6 monitors the maximum temperature $T_{1max}$ of the preheating cycle $V_1$ by way of the CNC 3 via a transparent area in the protective gas cover 10.

The two initial powders are brought to the laser process zone 17 by the powder feeder 5 via the powder nozzle 16. To this end the powder feeder nozzle 16 is directed at the center of the laser process zone 17 at an angle of 45° to the laser beam axis. The laser process zone 17 is adequately protected from oxidation by a gentle surface-parallel inert gas flow from the protective gas outlet 20.

Figure 2:
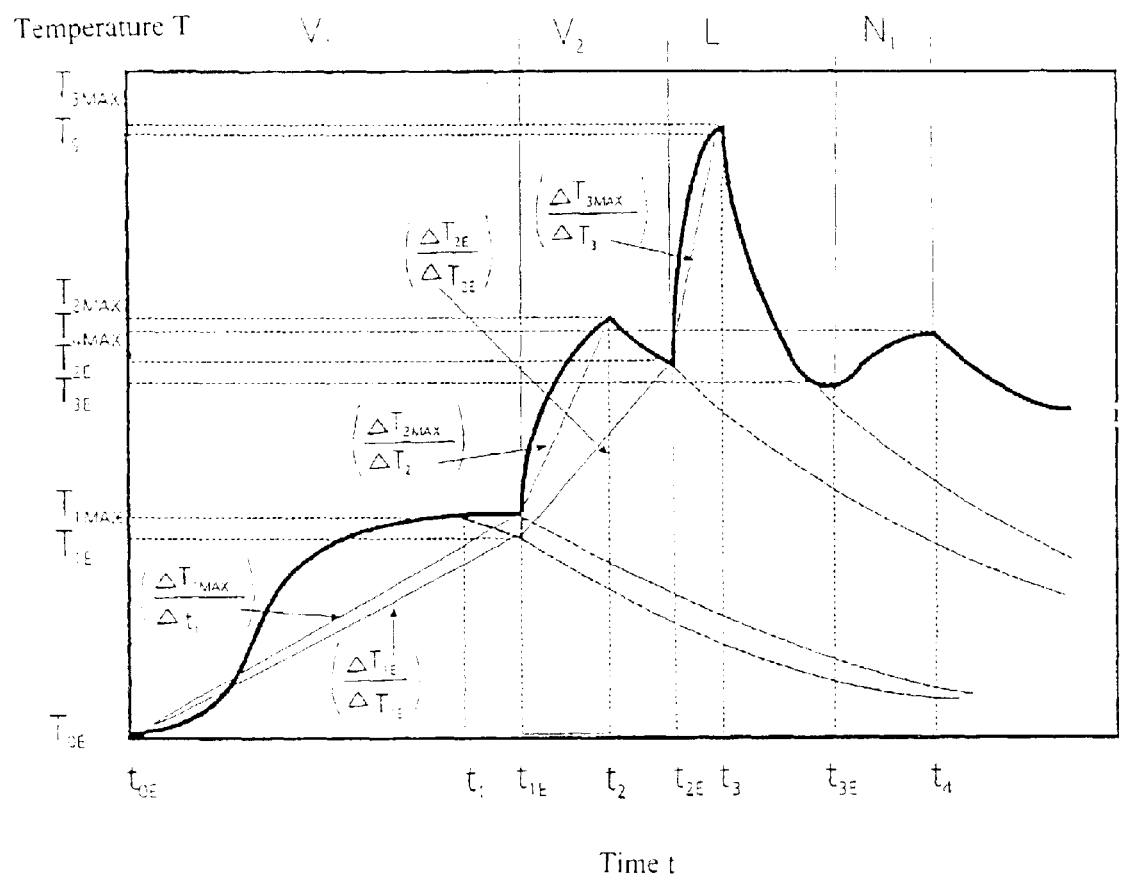
FIG. 2 shows the temperature sequence according to the invention for crack-free laser build-up welding at very high feed rates.

To make it more comprehensible, FIG. 2 demonstrates the temperature-time sequence according to the invention. It becomes clear how, after a short-time preheating in the preheating cycle $V_1$, the more intensive, but even shorter-time heating in the preheating cycle $V_2$ starts. Due to the very short-time and intensive energy input in the preheating cycle $V_2$, the energy and process-related conditions for the subsequent laser build-up welding can be improved with a minimal total energy charge to the extent that feed rates higher by one order of magnitude are possible. The preheating in the preheating cycle $V_1$, however, lasts somewhat longer, extends deeper and thus essentially causes the necessary reduction of the temperature gradients to avoid cracks. When the temperature during the cooling in the coating and in the surrounding heat affected zone of the component reaches the critical range, the many unsteady temperature fields of preheating cycle $V_2$ and laser process cycle $L_1$ provided with larger temperature gradients have already leveled off such that they no longer cause any substantial increase in the temperature gradients of the temperature field resulting from the preheating cycle $V_1$. When necessary, as described above, an additional postheating cycle $N_1$ can be added. This temperature sequence represents an optimum between the target functions requiring in part different optimization strategies minimal heat influence of the component on the one hand, and the avoidance of cracks and highest processing speed on the other.

To conduct the process, after inserting the shaft 18 into the laser machining system 4, the former is displaced at a speed of rotation of $v_x$=4000 mm/min and a feed rate of $v_y$=70 mm/min. This corresponds to a line speed of $v_B = \sqrt{v^2_x + v^2_y}$=4000.6 mm/min. The laser 1 is set at a laser power of 5.0 kW. The beam diameter in the laser point of impact is determined by processes of the laser beam shaping system 15 in direction z at a value of 5.5 mm. A frequency of approx. 20 kHz is set on the induction generator 2 and an inductive power of 30 kW is preset. In contrast to Yoshiwara and Kawanami, the inductive power is thus greater than the laser power by a multiple. At the same time as the start of the movement program, the induction generator is switched on. At the end of the preheating cycle $V_1$ a temperature $T_{1max}$ of 620° C. is reached. The temperature $T_{2max}$ resulting at the end of the preheating cycle $V_2$ is 1010° C. The laser is switched on after the first material area thus heated has reached the position of the laser beam incidence point 17. To avoid coating defects caused by inertia of feeding the powder, the powder feeder 5 is activated CNC-controlled 6 s before switching on the laser 1. The powder feeding rate is 6.0 kg/h. The estimated powder utilization is 75%. With this component and material, the cooling down occurs in air without additional measures for inductive postheating or accelerated cooling in uncritical temperature ranges.

After cooling, the build-up welded layer and the shaft are free from cracks. The structure and the hardness obtained are comparable to the states achieved without preheating. In comparison with conventional laser build-up welding, the feed rate VB is increased by a factor of 8 (from 500 mm/min to 4000 mm/min), the cladding-area ratio is increased by a factor of 8 (from 0.075 m²/h to 0.6 m²/h) and the coating rate is increased by a factor of 11 (from 0.4 kg/h to 4.5 kg/h).

Figure 3:
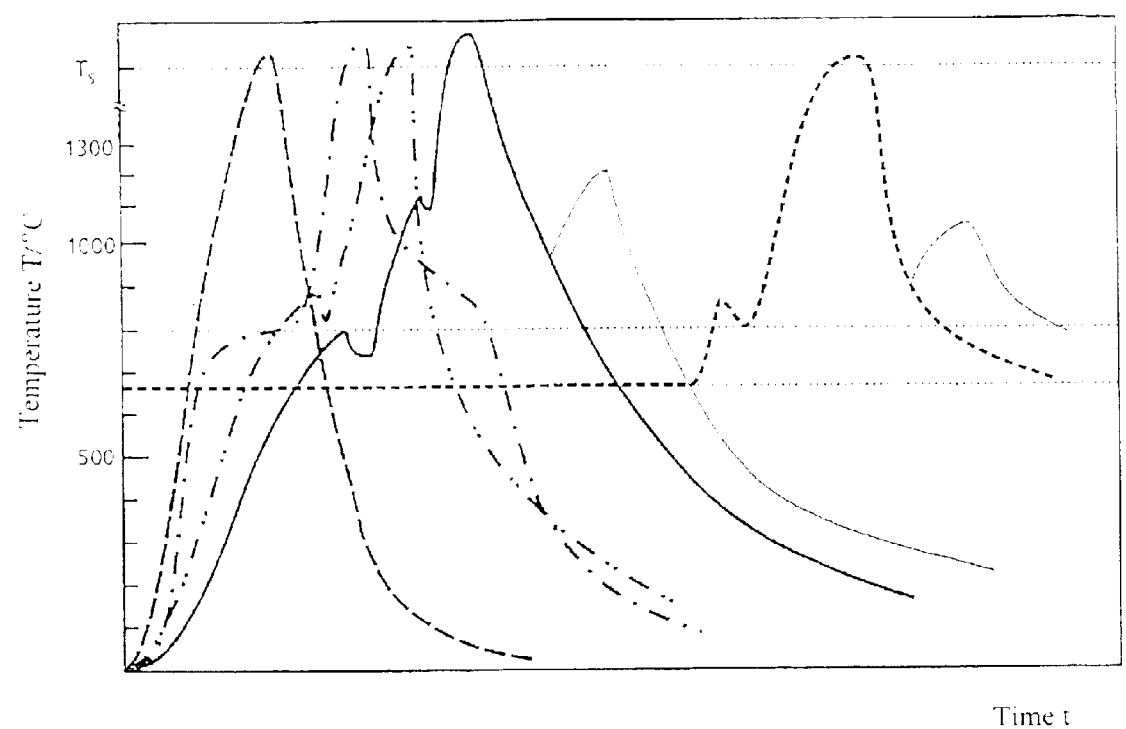
FIG. 3 shows a diagrammatic comparison of the temperature-time cycle according to the invention with those known from the prior art. The line on the chart exemplified by the three dashes illustrates conventional laser build-up welding. The line of the chart exemplified by the solid line illustrates the temperature-time progression according to the invention. The line of the chart exemplified by the five dashes illustrates the temperature-time progression after furnace preheating and short-time inductive preheating to a max. preheating temperature $T_{2max}$, =800° C. (Yoshiwaru, Kawanmi; PS EP 0190378A1). The line of the chart exemplified by the dash-dot-dot-dash illustrates the temperature-time progression with single-stage inductive preheating to a max. preheating temperature $T_{2max} \approx 800°$ C. (Brenner et al.; HTM). The line of the chart exemplified by the dash-dot-dash illustrates the temperature-time progression with single-stage inductive preheating to a max. preheating temperature $T_{2max} \approx 800°$ C. maintaining the preheating temperature at a constant level during the laser treatment (Guilloud et al.; PS EP 0462047B1)

In FIG. 3 the process according to the invention is compared to the prior art: the conventional laser build-up welding (broken line in FIG. 3) features a very rapid temperature change up to reaching the melting temperature $T_S$, a comparatively long laser beam reaction due to the only possible low feed rate and a rapid temperature change during cooling over the entire temperature range between melting temperature $T_S$ and approx. 100° C. The achievable feed rates are very low because of the large energy requirement and because of the necessary reduction of the cooling rate to reduce the risk of cracks. Consequently, only relatively ductile, coating materials susceptible to cracking can be applied.

In contrast, the three previously known variants of the inductively supported laser build-up welding feature the possibility of reducing the cooling speed without major interventions in the laser treatment parameters that would impair the process.

If the preheating of the entire functional area is fully completed before the start of the laser build-up welding and the preheating temperature is maintained at a constant level during the laser build-up welding by reduced energy input (dash-and-dot line in FIG. 3 [Guilloud, R., et al. EP 0462 047B1]), in critical temperature ranges a considerable reduction of the temperature change speed and thus an effective avoidance of cracks can be achieved. However, in the case of large functional areas, the thermal loading on the component is too great. Furthermore, the preheating temperature is limited due to the relatively long critical ranges, which is why no substantially higher feed rates can be achieved.

Yoshiwara and Kawanami ([EP 0190378A1] dotted line in FIG. 3) disclosed a laser build-up welding after lengthy, intensive conventional furnace preheating followed by a brief inductive preheating. Here the conventional furnace preheating is necessarily completed before the start of the laser build-up welding, while the superimposed inductive brief preheating takes place ahead of the laser beam. More favorable conditions are thus present regarding the avoidance of cracks; however, the process is considerably less favorable than the variant realized by Guilloud et al. regarding the thermal loading on the component, the risk of distortion and scaling and possibly necessary mechanical aftertreatment.

The inductive preheating can also occur in advance completely in one stage ([Brenner, B. et al., Härterei-Technische Mitteilungen, 52 (1997) no. 4, pages 221–225]dash-dot-dot line in FIG. 3). The exposure time at high temperature is thus shorter, the maximum temperature of the preheating cycle can be increased and cooling speeds that are low enough to avoid the formation of cracks are still achievable. In comparison with the two other processes of inductive preheating, with this variant substantially higher feed rates with reduced heat input and adequate avoidance of cracks were achieved.

The process according to the invention (solid line in FIG. 3), however, uses two coordinated inductive short-time heating cycles which can both occur in advance, often without loss of cycle time. The first preheating cycle is adjusted in terms of duration, maximum temperature, reaction area, reaction depth and reaction duration such that the cooling speed can be reduced to the value necessary for avoiding cracks in the specific case. However, the second preheating cycle definitely realized in advance ensures only a very short-time heating around the area close to the surface (without substantial in-depth heat conduction) to very high heating temperatures not hitherto practicable. High feed rates not hitherto achievable are thus possible.

Without violating the inventive concept, a plasma torch can also be used instead of the laser beam as the source of high-energy energy reaction to produce the process cycle L.

EXAMPLE 2

Figure 4:
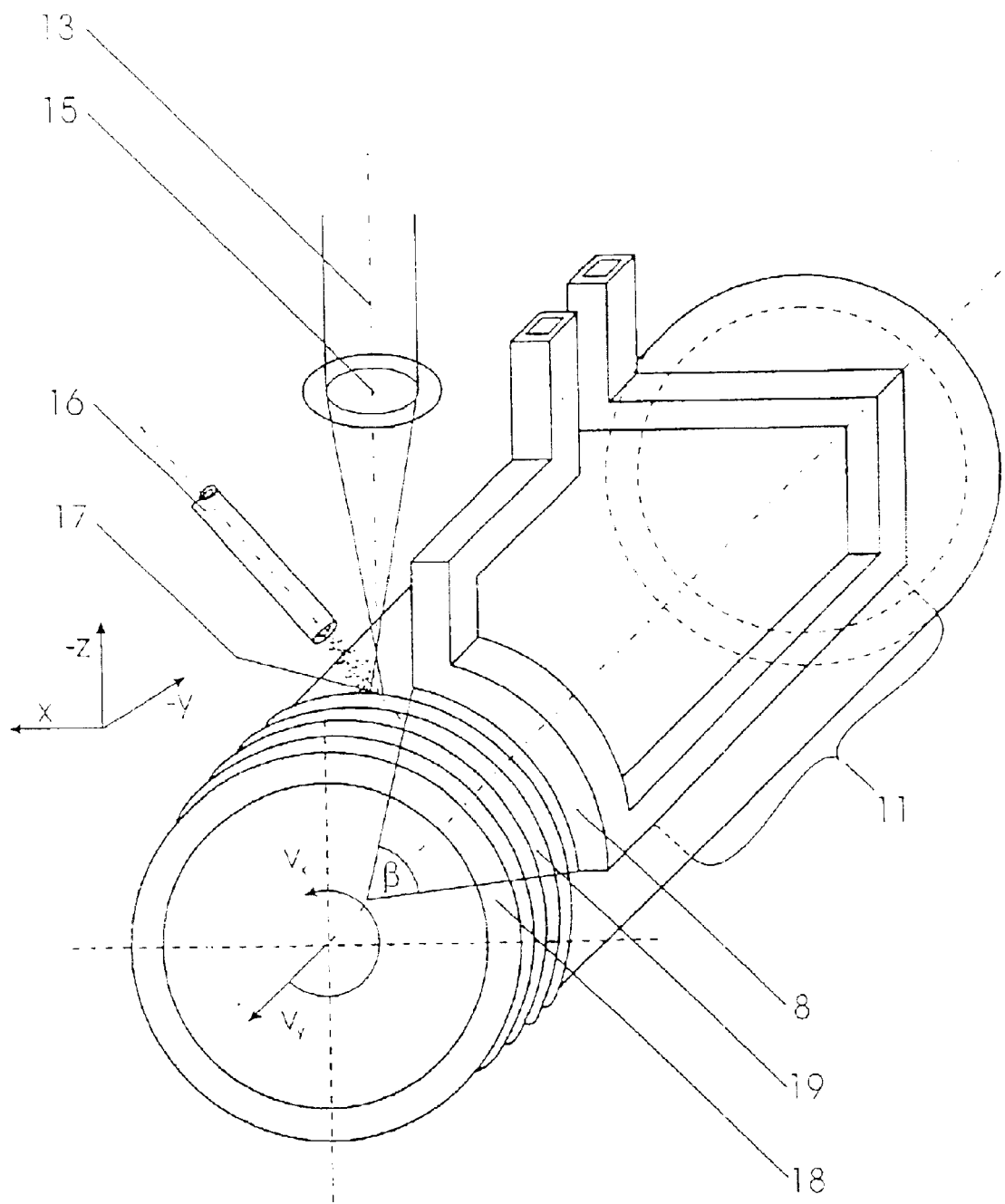
FIG. 4 shows the arrangement for the inductively supported laser build-up welding of the wear areas of special steam generator pipes.

A steam generator pipe (cf. (18) in FIG. 4) is to be used in a corrosive environment. Since it is uneconomical to manufacture the whole pipe of an expensive corrosion-resistant material, it should be made of the cost-effective St52-3 structural steel and be protected with the material NiCr21Mo9Nb by a build-up welding process. Due to the low feed rate, the conventional build-up welding processes insert too much and undefined heat, so that it is difficult to keep the mixture at the necessary low level. However, laser build-up welding is uneconomical because the feed rate is too low.

To resolve this, a special embodiment of the arrangement according to the invention is used which is characterized by its particular simplicity (see FIG. 4). The inductive preheating is realized by an inductor $I_{12b}$ which contains the two inductor branches 11 and 8 which form the two inductors 11 and 12. While the inductor $I_1$ 11 is arranged in the direction $\bar{y}$ of the longitudinal feed of the pipe, the inductor $I_2$ 8 extends parallel to the longitudinal direction of the build-up welding beads. This means that the inductor branch $I_2$ extends in the direction $\bar{b}$ of the line speed $v_B = \sqrt{v_x^2 + v_y^2}$ and thus $\Delta=0°$ results. The inductor $I_{12b}$ is made throughout of a Cu pipe with a cross section of 8×8 mm². The angle of wrap β is 80°. With a pipe outside diameter of 40 mm, a pipe wall thickness of 4 mm, the inside diameter of the inductor branch $I_2$ 8 is 46 mm, the coupling spacing is thus 3 mm. The inductor $I_{12b}$ is positioned in the y direction such that the middle of the inductor branch $I_2$ 8 is shifted by 2 mm relative to the projection of the laser beam on the pipe circumference in direction y. The inductor branch $I_1$ 11 is approx. $k_y$=40 mm long. The powder is fed in a feeder, whereby the powder forward run position nozzle is directed in the laser beam point of impact $L_P$ 17. In order to improve the injection of the inductive energy, both inductor branches are provided with magnet amplifying sheets. The inductor branch $I_2$ 8 is provided with a protective gas cover (both omitted in FIG. 4 for reasons of clarity).

Through this arrangement of the two inductor branches and the protective gas cover, on the one hand a relatively gentle preheating within the preheating cycle $V_1$ is realized, and on the other a very high peak temperature $T_{2max}$ of the preheating cycle $V_2$ is achieved without inconvenient scaling. The achievable feed rate is larger by a factor of 10 than with conventional laser build-up welding.

With this described arrangement, other pipe-shaped products, such as, e.g., pipes for geological explorations, oil drill pipes, hydraulic cylinders and pump cylinders can also be coated in basically the same way.

List of Abbreviations Used

| | |
|---|---|
| $V_1$ | Preheating cycle 1 |
| $V_2$ | Preheating cycle 2 |
| L | Laser process cycle |
| $N_1$ | Postheating cycle 1 |
| $T_{1max}$ | Maximum temperature of the preheating cycle 1 |
| $T_{2max}$ | Maximum temperature of the preheating cycle 2 |
| $T_{3max}$ | Maximum temperature of the laser process cycle $L_1$ |
| $T_S$ | Melting temperature |
| $T_{4max}$ | Maximum temperature of the postheating cycle $N_1$ |
| $T_{1E}$ | Temperature at the end of the preheating cycle $V_1$ |
| $T_{2E}$ | Temperature at the end of the preheating cycle $V_2$ |
| $\Delta T_{1max}$ | Maximum temperature increase in the preheating cycle $V_1$ |
| $\Delta T_{2max}$ | Maximum temperature increase in the preheating cycle $V_2$ |
| $\Delta T_{3max}$ | Maximum temperature increase during the laser process cycle L |
| $\Delta T_{1n}{}^*$ | Pulsating temperature increase in the preheating cycle $V_1$ |
| $\Delta T_2{}^*$ | Pulsating temperature increase in the preheating cycle $V_2$ |
| $T_Y$ | Austenization temperature |
| $T_{MS}$ | Martensite starting temperature |
| $t_1$ | Time of switching off the energy input in the preheating cycle $V_1$ |
| $t_2$ | Time of switching off the energy input in the preheating cycle $V_2$ |
| $t_3$ | Time of ending the laser beam reaction in the laser process cycle L |
| $t_4$ | Time at the end of the postheating cycle $N_1$ |
| $t_{1E}$ | Time at the end of the preheating cycle $V_1$ |
| $t_{2E}$ | Time at the end of the preheating cycle $V_2$ |
| $t_{3E}$ | Time of the end of the laser process cycle L |
| $\Delta t_1$ | Heat input time during the preheating cycle $V_1$ |
| $\Delta t_2$ | Heat input time during the preheating cycle $V_2$ |
| $\Delta t_3$ | Heat input time during the laser process cycle L |
| $z_1$ | Heat penetration depth during the preheating cycle $V_1$ |
| $z_2$ | Heat penetration depth during the preheating cycle $V_2$ |
| $I_1$ | Inductor part 1 |
| $I_2$ | Inductor part 2 |
| $I_3$ | Inductor to produce the postheating cycle |
| $I_G$ | Combination inductor for the simultaneous production of the preheating cycles $V_1$ and $V_2$ (comprising $I_1$ and $I_2$) |
| $I_{12a}$ | Inductor for the simultaneous production of both preheating cycles by means of rapid relative movements between the inductor and the workpiece |
| $I_{12b}$ | Specially formed inductor for the simultaneous production of both preheating cycles $V_1$ and $V_2$ |
| $I_{123}$ | Combination inductor for the simultaneous production of the preheating cycles $V_1$, $V_2$ and the postheating cycle $N_1$ |
| $P_1$ | Heat flow density of the 1st preheating cycle |
| $P_2$ | Heat flow density of the 2nd preheating cycle |
| $F_{11}$ | Effective area of the inductor $I_1$ |
| $F_{12}$ | Effective area of the inductor $I_2$ |
| $L_P$ | Laser beam incidence point, laser process zone |
| $F_1$ | Frequency inductor 1 |
| $F_2$ | Frequency inductor 2 |
| N | Number of the pulse in the pulsating preheating cycle $V_1$ |
| M | Factor |
| $k_y$ | Length of the inductor effective area of the inductor branch $I_1$ of the inductor $I_{12b}$ |
| $k_x$ | Length of the inductor effective area of the inductor branch $I_2$ of the inductor $I_{12b}$ |
| $K_{1x}$ | Expansion of the inductor branch $I_1$ of the inductor $I_{12b}$ in the x direction |
| $K_{2x}$ | Expansion of the inductor branch $I_2$ of the inductor $I_{12b}$ in the x direction |
| $v_B$ | Tracking velocity of the component |
| $v_x$ | Tracking velocity in the x direction |
| $v_y$ | Tracking velocity in the y direction |
| $v_{B1}$ | Tracking velocity of the inductor |
| y | Coordinate axis |
| x | Coordinate axis, inductor longitudinal axis of inductor $I_{12b}$ |

-continued

List of Abbreviations Used

| | |
|---|---|
| α | Angle between the inductor longitudinal axis of the inductor $I_{12b}$ and the direction of the line speed |
| β | Angle of wrap of the rotationally symmetrical workpiece |
| a | Track spacing |
| b̄ | Direction of the line speed |
| r | Radius of the axially symmetrical workpiece |
| $d_0$ | Permissible layer thickness of the oxide film of the workpiece |
| r̄ | Position vector of the temperature field |

List of Reference Numbers from FIG. 1 and FIG. 4

| | |
|---|---|
| 1 | Laser |
| 2 | Induction generator |
| 3 | CNC |
| 4 | Laser work station, laser machining system |
| 5 | Powder feeder |
| 6 | Pyrometer for monitoring and regulating the inductive preheating |
| 7 | Pyrometer for monitoring and regulating the coating process |
| 8 | Inductor part $I_2$ for realizing the preheating cycle $V_2$ |
| 9 | Duct for protective gas inlet |
| 10 | Protective gas cover |
| 11 | Inductor part $I_1$ for realizing the preheating cycle $V_1$ |
| 12 | Magnetic field amplifying sheet of the inductor part $I_2$ |
| 13 | Laser beam |
| 14 | Bending mirror for laser beam |
| 15 | Laser beam shaping system |
| 16 | Powder feeder nozzle |
| 17 | Laser process zone and laser beam incidence point $L_P$ |
| 18 | Workpiece |
| 19 | Build-up welded seam |
| 20 | Protective gas outlet |
| 21 | Protective gas outlet |

What is claimed is:

1. A process for producing wear-resistant surface layers using laser beam treatment on inductively heatable workpieces, wherein the process satisfies the following conditions:

inductive preheating occurs in at least one of two preheating cycles $V_1$ and $V_2$ which directly follow one another;

temperature fields produced by the two preheating cycles $V_1$ and $V_2$ are inhomogeneous and unsteady;

effective heat flow density $p_1$ of first preheating cycle $V_1$ is lower than a heat flow density $p_2$ of second preheating cycle $V_2$;

the first preheating cycle $V_1$ utilizes a maximum temperature $T_{1max}$ in relation to a melting temperature $T_S$ of a base material of the workpiece, satisfying the expression:

$$0.2 \leq \frac{T_{1max}[°C]}{T_S[°C]} \leq 0.6;$$

a maximum temperature $T_{2max}$ of the second preheating cycle $V_2$ lies within the following temperature interval:

$$0.3 \leq \frac{T_{2max}[°C]}{T_S[°C]} \leq \frac{T_S[°C] - 50K}{T_S[°C]};$$

a ratio $T_{3max} > T_S$ applies for maximum temperature $T_{3max}$ of a laser process cycle L; and the following ratios apply for relations between the two preheating cycles $V_1$ and $V_2$:

$$T_{2max} \geq T_{1max} + 50\ K;$$

$$\left(\frac{\Delta T_{1max}}{\Delta t_1}\right) < \left(\frac{\Delta T_{2max}}{\Delta t_2}\right);$$

$$\Delta t_1 \geq m*\Delta t_2 \text{ with } 1.5 \leq m \leq 30;$$

$$z_1 \geq 1.5*z_2$$

whereby $\Delta T_{1max}$ and $\Delta T_{2max}$ correspond to temperature increases, $\Delta t_1$ and $\Delta t_2$ correspond to heat reaction times, and $z_1$ and $z_2$ correspond to heat penetration depths during the preheating cycles $V_1$ and $V_2$.

2. The process according to claim 1, wherein the two preheating cycles $V_1$ and $V_2$ are produced using two different inductors $I_1$ and $I_2$ rigidly arranged relative to one another and relative to the laser beam point of impact $L_p$, whereby heat flow density $p_1$ of the inductor $I_1$ is smaller and the heat input time $\Delta t_1$ and an effective area $F_{11}$ of the inductor $I_1$ is larger than corresponding values of inductor $I_2$.

3. The process according to claim 2, wherein the two inductors $I_2$ and $I_2$ are operated at different frequencies, a frequency of inductor $I_1$ corresponding to $f_1$ and a frequency of inductor $I_2$ corresponding to $f_2$, whereby $f_1 < f_2$.

4. The process according to claim 2, wherein the inductor $f_1$, is a medium frequency and the inductor $f_2$ is a high frequency.

5. The process according to claim 2, wherein the two inductors $I_1$ and $I_2$ are physically arranged to form an inductor $I_G$ and a larger effective heat flow density $p_2$ of the inductor 12 is achieved with simultaneously lower heat reaction input time $\Delta t_2$ and lower effective area $F_{12}$ by way of an increased inductive field concentration of smaller areas of the inductor $I_G$ turned towards the laser beam point of impact $L_p$.

6. The process according to claim 5, wherein the increased inductive field concentration is achieved by way of at least one of:

magnetic field amplification elements;

using a different inductor cross section; and using closer coil spacing.

7. The process according to claim 1, wherein the two preheating cycles $V_1$ and $V_2$ are produced with a single inductor $I_{12a}$, in that the inductor $I_{12a}$ is moved sufficiently quickly backwards and forwards relative to the laser beam point of impact $L_p$, wherein the inductor $I_{12a}$ strokes over both preheating zones of preheating cycles $V_1$ and $V_2$, and wherein higher heat flow density $p_2$ of the second preheating cycle $V_2$ is achieved.

8. The process according to claim 1, wherein the maximum temperatures $T_{1max}$ and $T_{2max}$ of the preheating cycles $V_1$ and $V_2$ are achieved by way of pulsating temperature increases $\Delta T_1*_n$ and $\Delta T_2*$, whereby the first preheating cycle $V_1$ comprises up to n<50 temperature cycles $T_1*_n$ and the second preheating cycle $V_2$ comprises a maximum of one temperature cycle $T_2*$ and the ratio $\Delta T_1*_n << \Delta T_2*$ applies between the temperature increases $\Delta T_1*_n$ and $\Delta T_2*$.

9. The process according to claim 8, wherein the pulsating temperature increases $\Delta T_1*_n$ and $\Delta T_2*$ are produced by a single inductor $I_{12b}$, longitudinal axes $k_1$ and $k_2$ of the two inductors $I_1$ and $I_2$ extending parallel or almost parallel to directions ȳ and x̄, whereby for an expansion of the two inductors $I_1$ and $I_2$ in x̄ direction $k_{1x}$, and $k_{2x}$, $k_{1x} << k_{2x}$ applies, whereby the laser beam point of impact $L_p$ is located at a constant distance behind the inductor $I_2$ in the inductor longitudinal axis, the inductor $I_{12b}$ is moved relative to the workpiece at a line speed $v_B$ preset by the laser process in a direction $\overline{b}$ which includes an angle $\alpha$ to the inductor longitudinal axis $\overline{k}_x$ of the inductor $I_2$ and whereby the following ratios are maintained:

$0° \leq \alpha \leq 9°$ $v_y = v_B * \sin \Delta$ $v_x = v_y * \cot\alpha >> v_y$ ($v_y$—tracking velocity in y direction, $v_x$—tracking velocity in x direction).

10. The process according to claim 9, wherein the workpiece is a large axially symmetrical workpiece with a radius r and wherein the treatment occurs in spiral paths with a track spacing a, the angle $\alpha$ between the inductor longitudinal axis $\overline{x}$ of the inductor $I_{12b}$ and the direction $\overline{b}$ of the line speed $v_B$ is set at value $\Delta = \arctan$ $$\left(\frac{a}{2\pi r}\right)$$

and an angle of wrap $\beta$ of the large axially symmetrical workpiece by the inductor $I_{12b}$ is $10° \leq \beta \leq 180°$.

11. The process according to claim 9, wherein the workpiece has large even surfaces and wherein the treatment using even and parallel paths and an angle $\alpha=0$.

12. The process according to claim 1 wherein the maximum temperatures $T_{1max}$ of the first preheating cycle $V_1$ is not reached until a start of the second preheating cycle $V_2$.

13. The process according to claim 1, wherein the first preheating cycle $V_1$ is produced inductively and the second preheating cycle $V_2$ occurs through an influence of one or more high-power diode lasers.

14. The process according to claim 1, wherein a gas shielding is utilized during the first preheating cycle $V_1$ such that an oxidation of the workpiece occurs up to a layer thickness $d_0$ of $d_0 < 0.5$ μm.

15. The process according to claim 14, wherein a further oxidation of the workpiece during the second preheating cycle $V_2$ is avoided by way of an inert gas shielding acting largely on a preheating zone of the second preheating cycle $V_2$.

16. The process according to claim 1, wherein a gas shielding is utilized during the first and second preheating cycles $V_1$ and $V_2$ such that an oxidation of the workpiece occurs up to a layer thickness $d_0$ of $d_0 < 0.5$ μm.

17. The process according to claim 1, wherein the laser beam treatment comprises build-up welding during a laser process cycle L.

18. The process according to claim 1, wherein the laser beam treatment comprises one of laser alloying and laser gas alloying during a laser process cycle L.

19. The process according to claim 1, wherein the laser beam treatment comprises remelting a surface layer during a laser process cycle L.

20. The process according to claim 1, wherein the laser beam treatment comprises soldering during a laser process cycle L.

21. The process according to claim 1, further comprising subjecting materials that are very susceptible to cracking to a postheating cycle, whereby a maximum temperature $T_{4max}$ of the postheating cycle $N_1$ is in a temperature range of:

$$0.25 \leq \frac{T_{4max}[°C]}{T_S[°C]} \leq 0.8.$$

22. The process according to claim 21, wherein the postheating cycle $N_1$ is produced inductively.

23. The process according to claim 21, wherein the inductors $I_1$ and $I_2$ are combined to form one inductor $I_{123}$ to produce the first and second preheating cycles $V_1$ and $V_2$ with the inductor $I_{123}$ the postheating cycle $N_1$.

24. The process according to claim 1, wherein the workpiece comprises one of a hardenable steel and a cast iron and wherein the temperature $T_{2max}$ of the second preheating cycle $V_2$ is greater than an austenization temperature $T_y$ and wherein, after an end of a corresponding laser process cycle L, a cooling from a temperature $T=M_S$ is conducted in an accelerated manner such that a martensitic conversion takes place at least under and next to a layer heated by the laser to a temperature $T_{3max} > T_S$.

25. The process according to claim 1, further comprising using a plasma torch as a highly concentrated energy source for surface layer finishing.

26. The process according to claim 1, wherein the laser beam treatment utilizes an additive in the form of a wire.

27. The process according to claim 1, wherein the laser beam treatment utilizes an additive in the form of a ribbon.

28. The process according to claim 1, wherein the laser beam treatment utilizes an additive in molten form.

29. A process for producing wear-resistant surface layers using laser beam treatment on inductively heatable workpieces, wherein the process comprises:

arranging a workpiece in a first location;

subjecting the workpiece to a first inductive preheating cycle $V_1$;

moving the workpiece to a second location following the first location;

subjecting the workpiece to second preheating cycle $V_2$, wherein the second preheating cycle $V_2$ utilizes at least one of:
inductive heating;
laser heating;

moving the workpiece to a third location following the second location;

forming at least one wear-resistant layer on the workpiece using a multi-component coating material and at least one of a laser and a plasma torch, wherein the process occurs under the following conditions:
an effective heat flow density $p_1$ of first preheating cycle $V_1$ is lower than a heat flow density $p_2$ of second preheating cycle $V_2$;
the first preheating cycle $V_1$ utilizes a maximum temperature $T_{1max}$ in relation to a melting temperature $T_S$ of a base material of the workpiece, satisfying the expression:

$$0.2 \leq \frac{T_{1max}[°C]}{T_S[°C]} \leq 0.6;$$

a maximum temperature $T_{2max}$ of the second preheating cycle $V_2$ lies within the following temperature interval:

$$0.3 \leq \frac{T_{2max}[°C]}{T_S[°C]} \leq \frac{T_S[°C] - 50K}{T_S[°C]};$$

a ratio $T_{3max} > T_S$ applies for maximum temperature $T_{3max}$ of process cycle L during the forming; and the following ratios apply for relations between the two preheating cycles $V_1$ and $V_2$:

$T_{2max} > T_{1max} + 50\ K$;

$$\left(\frac{\Delta T_{1max}}{\Delta t_1}\right) < \left(\frac{\Delta T_{2max}}{\Delta t_2}\right);$$

$\Delta t_1 \geq m^* \Delta t_2$ with $1.5 < m < 30$;

$z_1 \geq 1.5^* z_2$ whereby $\Delta T_{2max}$ correspond to temperature increases, $\Delta t_1$ and $\Delta t_2$ correspond to heat reaction times, and $z_1$ and $z_2$ correspond to heat penetration depths during the preheating cycles $V_1$ and $V_2$.

* * * * *